Nov. 27, 1962    F. R. MEIERHOFER    3,065,973
CONTROL MEANS FOR EXPANDABLE CHUCKING DEVICES
Filed March 8, 1960    2 Sheets-Sheet 1

INVENTOR:
FRIEDRICH ROBERT MEIERHOFER

Nov. 27, 1962 F. R. MEIERHOFER 3,065,973
CONTROL MEANS FOR EXPANDABLE CHUCKING DEVICES
Filed March 8, 1960 2 Sheets-Sheet 2
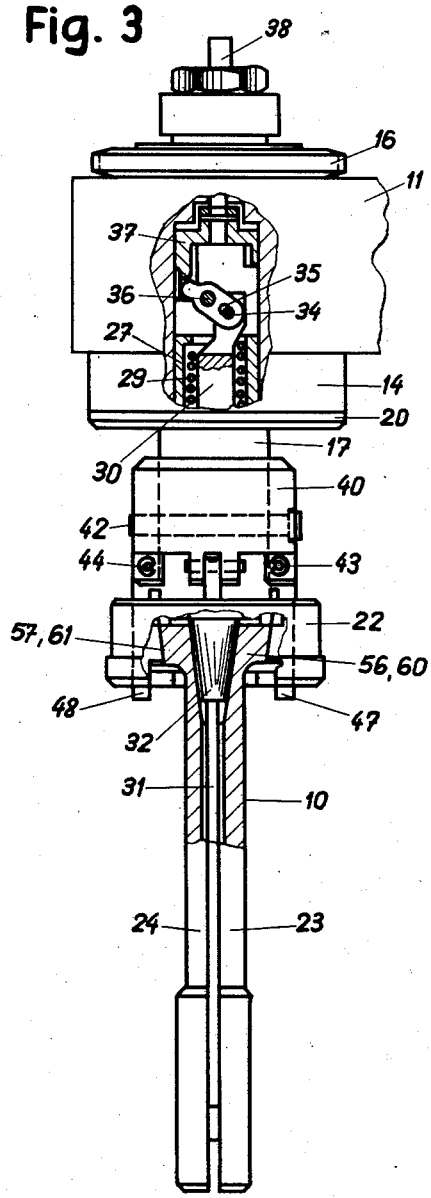
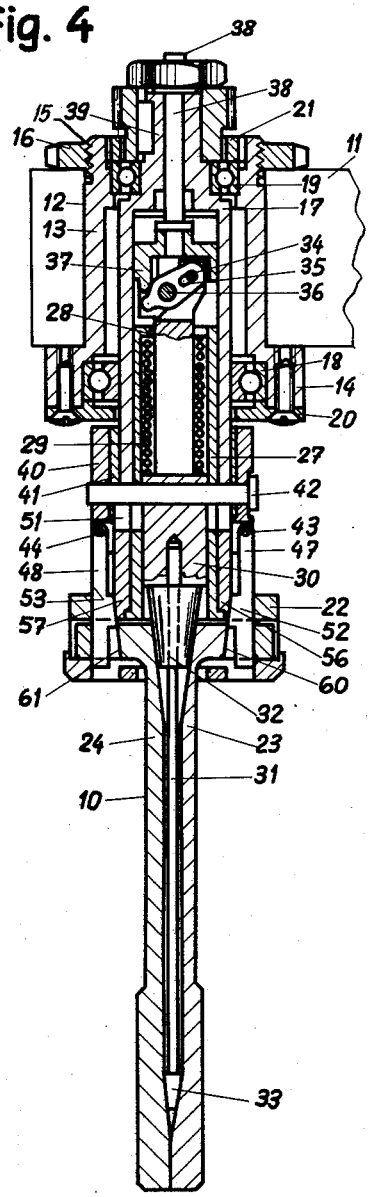
INVENTOR:
FRIEDRICH ROBERT MEIERHOFER

United States Patent Office 3,065,973
Patented Nov. 27, 1962

3,065,973
CONTROL MEANS FOR EXPANDABLE
CHUCKING DEVICES
Friedrich Robert Meierhofer, Bern, Switzerland, assignor to Maschinenfabrik Winkler, Fallert & Co. A.G., Bern, Switzerland
Filed Mar. 8, 1960, Ser. No. 13,595
Claims priority, application Switzerland Mar. 13, 1959
8 Claims. (Cl. 279—2)

This invention relates to control devices for expanding chucks and particularly to control devices in connection with holding hollow cylindrical bodies with narrow necks for use in printing, varnishing and like machines.

Hitherto hollow cylindrical bodies having narrow necks have been placed on ordinary cylindrical stems for external decorating purposes, such as printing, varnishing or the like processes. The diameter of these stems was slightly smaller than the reduced or narrow neck of the hollow cylindrical body, a relief area being provided on the stem in the area of the reduced neck. Obviously the position of the cylindrical hollow body on the stem or stud was eccentric and loose.

In another known fixation the cylindrical hollow body was placed on an angularly bent pin or stem, whereby the body was equally suspended eccentrically with respect to the stud.

This kind of suspension of cylindrical hollow bodies on the aforementioned pins or studs is not satisfactory for machines with automatic feeding and transferring devices because said hollow bodies, dangling on the studs, cannot be gripped or seized reliably by the receiving mechanisms. Furthermore such studs present a fairly poor support in the case of relatively long cylindrical hollow bodies having a portion of a smaller diameter because of the inevitable deflection of the studs, whereby printing on the outside face of such bodies becomes inaccurate.

Cylindrical hollow bodies without reduced or narrow necks used to be placed on closely fitting regular cylindrical studs for processing. However, by the frequent placing and removing of these hollow bodies the studs were subject to fast wear so that they had to be often replaced. Furthermore such hollow bodies which were slightly wider in diameter due to manufacturing tolerances could no longer be processed because the looseness on the stud would cause a blurred print.

This invention aims at overcoming these and other disadvantages and provides means instrumental in creating new and improved control elements for expanding chucks for locking cylindrical hollow bodies in place.

Another object of the present invention is to provide means affording easy and efficacious control of a plurality of rotatably mounted locking devices with expandable chucks using fluid operated actuating means for operating said expandable chucks.

A further object of the invention is to provide means contriving a novel and economical control for expanding chucks adapted to operate expanding means of said chucks under elastic pressure conditions.

Yet another object of this invention is to provide means facilitating concentrically and safely locking oblong hollow cylindrical bodies having reduced portions or necks with a smaller diameter than the hollow cylindrical body itself.

Furthermore, it is an object of the present invention to provide means permitting precise, continuous, economic, fast and safe control operations for rotatable expandable chucks in particular for locking hollow cylindrical bodies in position during operation of automatic printing, varnishing machines and like plants.

Various further and more specific purposes, features and advantages will clearly appear from the detailed description given below taken in connection with the accompanying drawings which form part of this specification and illustrate merely by way of example a preferred embodiment of the invention.

In the following description and in the claims, parts will be identified by specific terms for convenience, but such terms are intended to be as generic in their application to similar parts as the art will permit. Like reference characters denote like parts in the several figures of the drawings, in which:

FIG. 3 shows an expandable chuck, partly in section and in expanded position;

FIG. 4 shows a longitudinal section of an expandable chucking device with a cone-shaped mandrel in retracted position.

Figure 1:
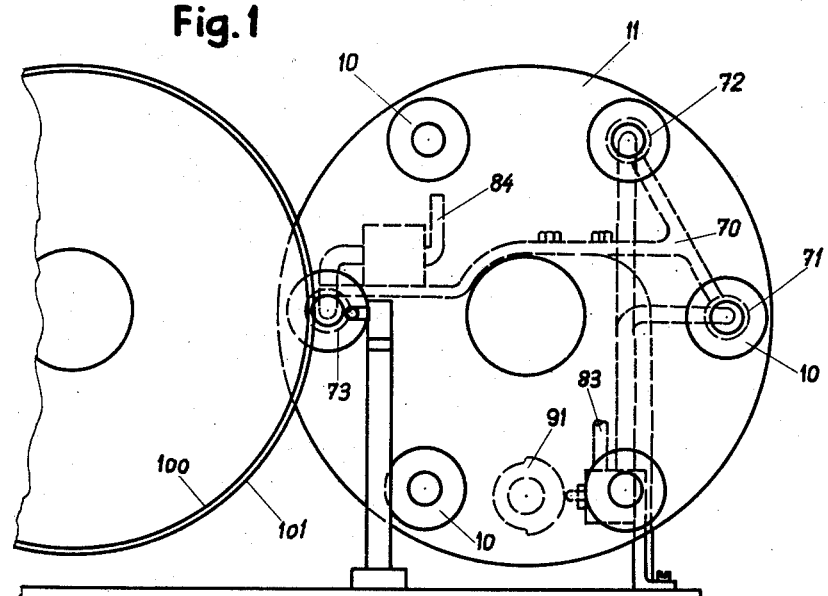
FIG. 1 shows a front view of a vertical turntable having a plurality of expandable chucks mounted thereon.

Referring now more in detail to the attached drawings illustrating a preferred embodiment by which the invention may be realized, there is disclosed in FIGS. 1 and 2 a vertically arranged indexing turntable 11 having mounted thereon near its periphery a plurality of chucking devices designated by the general numeral 10, and stationary mounted operating means for said chucking devices which will be explained later in more detail.

FIGS. 3 and 4 show the chucking device 10 in expanded and closed positions, respectively. In each of the corresponding bores 12 of the turntable 11 is a ball bearing bushing 13 having a flange 14 on one end and a threaded portion 15 on the opposite end thereof for receiving a ring nut 16 to secure said bushing 13 firmly on the turntable 11. In this bushing 13 is located the main chuck supporting bushing 17, rotatable in ball bearings 18 and 19, said ball bearings held in place by a retainer ring 20 and a ring nut 21, respectively. The main chuck supporting bushing 17 carries at 22 slidably four concentrically arranged expanding chucking elements, two of which, 23, 24, are indicated in the drawings.

A bearing bushing 27 is inserted into said main bushing 17, said bearing bushing 27 having a flange 28 against which a spring 29 abuts inside said bearing bushing 27. Centrally located and axially movable in the bearing bushing 27 is a piston 30 having attached to its lower end the expanding mandrel needle 31 which has an upper cone 32, and a lower cone 33 for evenly expanding the chuck parts. The upper portion of said piston 30 is reduced in order to provide for a space for the spring 29. On the upper head of said piston 30 is a pivot pin 34 engaging one end of a lever 35 which is pivotally held on a stud 36 secured in the chuck supporting bushing 17. The other end of said lever 35 abuts against a plug 37 axially and slidably arranged in said main chuck supporting bushing 17. The plug 37 carries a pin 38 secured thereto, said pin 38 protruding through a bore 39 over the upper parts of the main chuck supporting bushing 17. Concentrically arranged about the main chuck supporting bushing 17 is a sleeve 40 having a bearing bushing 41 therein. This sleeve 40 is secured to the piston 30 by a pin 42 and supports by means of short pins 43, 44, 45 and 46 four levers 47, 48, 49 and 50.

A slot 51 in the main chuck supporting bushing 17 and in the bearing bushing 27 permits an axial movement of said sleeve 40 in connection with said piston 30. Four levers, two of which 47, 48, are indicated are guided in associated slots two of which 52, 53 are indicated in head 22 of said main chuck supporting bushing 17 (only levers 47 and 48 and slots 52 and 53 are visible in the drawing). The levers all have slanted faces corresponding ones 56, 57 being unheated which correspond to slanted areas 60, 61, on the chucking elements 23 and 24.

In order to operate each of said chucking devices 10 on said turntable 11 there is mounted on a suitable supporting structure 70 in the rear of said turntable 11 a plurality of air or hydraulic cylinders 71, 72 and 73 having operating rods 74, 75 and 76 arranged opposite the pins 38 when the turntable is indexed to the corresponding loading, unloading and operating positions. The cylinders 71, 72 (FIG. 2) are connected by pipe lines 77, 78 with valves 79, 80 whereas cylinder 73 is connected by pipe line 81 with a solenoid valve 82. The necessary operating fluid (air or hydraulic fluid) is supplied to the valves 79, 80 and to the solenoid valve 82 by pipe lines 83 and 84, respectively, from any suitable source of supply (not shown).

A cam shaft 90 having cams 91, 92 and 93 is rotatably located in said supporting structure 70 and is geared to the drive of said turntable 11 in timed relationship (the gearing not being shown in the drawing). Cams 91 and 92 are set to operate the valves 79 and 80, respectively, and cam 93 operates a small sized electrical switch 94.

Arranged for operative engagement with every cylindrical hollow body in the operating position designated by numeral 95, is a printing cylinder 100 having a printing ink transferring means 101 secured thereto, such as for example a rubber blanket. At this operating location is located a further small sized electrical switch 102 contacting the narrower end of said cylindrical hollow body carried by said chucking device 10 and being set to operate the solenoid valve 82 when no hollow cylindrical body would be on a chucking device passing through the operating position 95 of the turntable.

*Operation*

Figure 2:
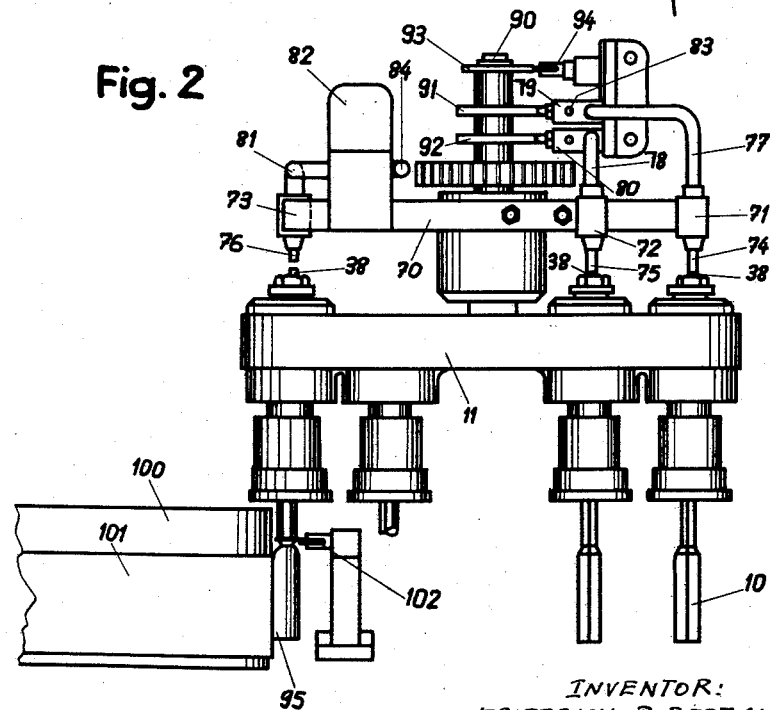
FIG. 2 is a plan view of the device of FIG. 1.

The turntable 11 with the chucking devices 10 is rotated indexing by increments of 60° as shown in FIG. 1, which however, may be varied according to prevailing manufacturing conditions.

When a finished product arrives at the indexing station opposite the fluid operated cylinder 72, the cam 92 on the cam shaft 90 which is rotated in timed relation with the turntable, opens valve 80, thus admitting fluid under pressure through the pipe line 78 to said cylinder 72. By the intermediate of operating rod 75 the pin 38 is pushed inwardly, whereby the lever 35 is tilted into the position shown in FIG. 4. Hereby the piston 30 is moved upwardly compressing the spring 29 and pulling by the pin 42 the sleeve 40 with it. Simultaneously the mandrel needle 31 is withdrawn and the levers 47 and 48, etc. are moved upwardly. By this combined action the four chucking elements 23, 24, etc. are contracted, unclamping the cylindrical hollow body which had been held by the respective chucking device during the printing operation.

The finished cylindrical hollow body now can be taken off. A conventional spring in the fluid cylinder retracts the piston in it when the cam closes the valve again. Hereby pin 38 becomes free, and the expanding spring 29 causes piston 30 to move downwards whereby the mandrel needle 31 through its two cones 32 and 33 expands the chucking elements, while the downward moving levers 47 and 48, etc. afford said chucking elements the freedom to move outwardly.

When the turntable 11 subsequently is indexed to the next position where fluid cylinder 71 is located opposite the position of the chucking device, a new cylindrical hollow body can be loaded onto the contracted chucking device. At this time the cam 91 has operated valve 79, temporarily admitting pressure fluid to cylinder 71 for contracting the chucking elements and subsequently expanding same after the new hollow cylindrical body had been loaded on it.

When the turntable continues indexing, the loaded chucking device is moved into contact with the rubber blanket 101 of a printing cylinder 100, and since the cylindrical hollow body is firmly and concentrically held by the chucking device, a satisfactory result of the operation is obtained. If it should happen that no cylindrical hollow body is clamped on one of the chucking devices, the following safety provision is made for preventing ink from being smeared on the chucking elements. Opposite the printing position of hollow body or container 95 of the chucking device is a fluid-operated cylinder 73 having an operating rod 76. Pressure fluid can be admitted to this cylinder through a solenoid valve 82 and pipe line 81.

A cam 93, also fastened on the cam shaft 90, operates a small sized electrical switch 94 electrically connected with the solenoid valve 82 during the time a chucking device is in the printing position. The second small sized electrical switch 102, equally electrically connected with the solenoid valve 82, is located opposite the operating position of the hollow cylindrical body to be printed. If there is by chance no cylindrical hollow body clamped on the chucking device, the small sized electrical switch 102 closes, the solenoid of valve 82 opens this valve and pressure fluid is admitted by the pipe line 81 to the fluid cylinder 73 causing operating rod 76 to push pin 38 inwardly thus contracting the chucking elements 23, 24, etc. and preventing them from being contacted by the printing cylinder blanket 101.

While the invention has been described and illustrated with respect to a certain particular preferred example which gives satisfactory results, it will be understood by those skilled in the art after understanding the principle of the invention, that various other changes and modifications may be made without departing from the spirit and scope of the invention and it is intended therefore in the appended claims to cover all such changes and modifications.

Having thus described the invention what is claimed as new and desired to be secured by Letters Patent, is:

1. An apparatus for advancing articles such as hollow bodies, opened containers, and the like into association with a device such as a printing cylinder and holding such articles while they are operated upon, comprising a turntable, means to index said turntable, a plurality of angularly spaced chucking elements mounted on said turntable, said chucking elements each including expandable jaw members adapted to expand outwardly for engaging an article, means in such chucking elements to bias said jaws in an expanded extended condition, a control member connected to said jaws and exposed on said chucking elements, control means including a plurality of reciprocatably mounted plunger members adapted to engage respective ones of said control members of said chucking elements and to move said control members to contact said jaws, and means operative in timed relationship to the indexing movement of said turntable to selectively reciprocate said plunger members in accordance with the relative position of said turntable, said means operative in timed relationship to the indexing movement of said turntable to reciprocate said plunger members including hydraulic pressure means and means to selectively direct hydraulic pressure to one side of said reciprocatable plunger members to reciprocate the latter into engagement with said control member of said chucking elements.

2. An apparatus for advancing articles such as hollow bodies, opened containers, and the like into association with a device such as a printing cylinder and holding such articles while they are operated upon, comprising a turntable, means to index said turntable, a plurality of angularly spaced chucking elements mounted on said turntable, said chucking elements each including expandable jaw members adapted to expand outwardly for engaging an article, means in such chucking elements to bias said jaws in an expanded extended condition, a control member connected to said jaws and exposed on said chucking elements, control means including a plurality of reciprocatably mounted plunger members adapted to engage respective ones of said control members of said chucking elements and to move said control members to contact said jaws, and means operative in timed relationship to the indexing movement of said turntable to selectively reciprocate said plunger members in accordance with the relative position of said turntable, at least one of said plunger members being located in relation to said turntable at a position overlying the position at which the container is to be operated upon and including sensing means at said operating position adapted to indicate the presence of a container at such location and means connecting said sensing means to said control means to reciprocate the plunger at the location of said operating station to contract said jaws in the event that a container is not present at such location.

3. An apparatus for advancing articles such as hollow bodies, opened containers, and the like into association with a device such as a printing cylinder and holding such articles while they are operated upon, comprising a turntable, means to index said turntable, a plurality of angularly spaced chucking elements mounted on said turntable, said chucking elements each including expandable jaw members adapted to expand outwardly for engaging an article, means in such chucking elements to bias said jaws in an expanded extended condition, a control member connected to said jaws and exposed on said chucking elements, control means including a plurality of reciprocatably mounted plunger members adapted to engage respective ones of said control members of said chucking elements and to move said control members to contact said jaws, and means operative in timed relationship to the indexing movement of said turntable to selectively reciprocate said plunger members in accordance with the relative position of said turntable, motor means for indexing said turntable, a plurality of rotary cams connected to said turntable for rotary movement in accordance with rotary movement of said turntable and wherein said control means includes a plurality of valves in a number corresponding to said cams and actuatable thereby to direct control fluid to said plungers to reciprocate said plungers.

4. An apparatus for advancing articles such as hollow bodies, opened containers, and the like into association with a device such as a printing cylinder and holding such articles while they are operated upon, comprising a turntable, means to index said turntable, a plurality of angularly spaced chucking elements mounted on said turntable, said chucking elements each including expandable jaw members adapted to expand outwardly for engaging an article, means in such chucking elements to bias said jaws in an expanded extended condition, a control member connected to said jaws and exposed on said chucking elements, control means including a plurality of reciprocatably mounted plunger members adapted to engage respective ones of said control members of said chucking elements and to move said control members to contact said jaws, and means operative in timed relationship to the indexing movement of said turntable to selectively reciprocate said plunger members in accordance with the relative position of said turntable, said chucking elements extending outwardly from one side of said turntable and including a control pin which extends outwardly from the opposite side, said plunger members being reciprocatably mounted on the side at which said control pin extends, a motor connected to said turntable and having a shaft extending outwardly therefrom, a plurality of cams mounted on said shaft, pressure control conduits extending to each of said plunger members for reciprocating said plunger members, control valves in each of said pressure control conduits and including control follower members adapted to engage the respective cams to open and close said valves whereby to selectively reciprocate said plunger members in accordance with the rotation of said turntable.

5. An automatic chuck comprising a tubular bushing means, a control pin reciprocatably mounted in said bushing means and extending outwardly from one end of said chuck, a lever member pivotally mounted on said tubular bushing means and having one arm portion disposed to contact said control pin for rotation thereby in accordance with movement of said control pin, a control piston member connected to the opposite end of said control lever and reciprocatable in said bushing means in accordance with rotational movement of said control lever, said control piston having an elongated portion extending outwardly from the opposite end, at least two elongated chuck jaw members complementarily arranged in a substantial cylinder with a central bore defined therebetween, each of the ends of said separable jaw members having frusto conical portions defined in said bores adjacent each end thereof, means connected to said bushing to contain the complementary portions of said jaws in a substantially tubular arrangement, said control piston member extending into the bore defined by said complementary jaw members and including spaced frusto-conical outstanding portions defined adjacent each end in areas adjacent the frusto conical portions of said complementary jaws whereby reciprocation of said piston control member under the control of said downward movement of said control pin is effective to spread said complementary jaws apart due to the movement of the frusto conical section portions of said control piston along similar sections of said bore to separate said jaws along the length thereof.

6. An automatic chuck according to claim 5, including means to bias said control piston downwardly whereby said frusto conical portions thereof are effective to spread said jaws apart.

7. An automatic chuck according to claim 5, wherein said control piston includes an elongated spindle extension which extends into the bore defined between said chuck elements and includes a frusto conical portion at its lower end adapted to move along the frusto conical interior walls of said bore to spread the walls of said chucking elements apart, and a second frusto conical portion at the upper end adapted to move along the frusto conical walls of the interior of the bores of said jaws on the portion thereof to spread this portion apart.

8. An automatic chuck according to claim 7, wherein said frusto conical portions defined on said spindle and by the complementary jaw portions are shaped to provide for uniform separation of said jaws along the entire length thereof during movement of said control piston.

References Cited in the file of this patent

UNITED STATES PATENTS

| | | |
|---|---|---|
| 1,835,591 | Bullard | Dec. 8, 1931 |
| 2,540,186 | Bullard et al. | Feb. 6, 1951 |
| 2,588,354 | Buescher | Mar. 11, 1952 |
| 2,601,518 | Harder | June 24, 1952 |
| 2,698,551 | Olsen | Jan. 4, 1955 |